(12) United States Patent
Anand

(10) Patent No.: US 11,388,670 B2
(45) Date of Patent: Jul. 12, 2022

(54) SYSTEM AND METHOD FOR OPTIMIZING POWER CONSUMPTION IN VOICE COMMUNICATIONS IN MOBILE DEVICES

(71) Applicant: TriSpace Technologies (OPC) Pvt. Ltd., Bengaluru (IN)

(72) Inventor: Narasimhan Vijay Anand, Bengaluru (IN)

(73) Assignee: TriSpace Technologies (OPC) Pvt. Ltd., Bangalore (IN)

( * ) Notice: Subject to any disclaimer, the term of this patent is extended or adjusted under 35 U.S.C. 154(b) by 213 days.

(21) Appl. No.: 16/891,343

(22) Filed: Jun. 3, 2020

(65) Prior Publication Data

US 2021/0084592 A1 Mar. 18, 2021

(30) Foreign Application Priority Data

Sep. 16, 2019 (IN) .............................. 201941037326

(51) Int. Cl.
*H04W 52/02* (2009.01)
*G10L 15/22* (2006.01)
(Continued)

(52) U.S. Cl.
CPC ........ *H04W 52/0235* (2013.01); *G06F 3/167* (2013.01); *G10L 15/1815* (2013.01);
(Continued)

(58) Field of Classification Search
CPC ..... G06F 3/165; G06F 3/167; G10L 15/1815; G10L 15/1822; G10L 15/22; G10L 19/16;
(Continued)

(56) References Cited

U.S. PATENT DOCUMENTS 6,233,324 B1 * 5/2001 Sebestyen .......... H04N 1/00281
370/282
7,437,540 B2 * 10/2008 Paolucci ............. G06F 15/7864
712/35
(Continued)

OTHER PUBLICATIONS

Ren et al., A VLIW DSP for communication applications, Dec. 14, 2015, 2015 Sixth International Green and Sustainable Computing Conference (IGSC), pp. 1-5, doi: 10.1109/IGCC.2015.7393733. (Year: 2015).*

*Primary Examiner* — Eric Nowlin
(74) *Attorney, Agent, or Firm* — J. Peter Paredes; Amin Talati Wasserman LLP

(57) ABSTRACT

The present invention provides a system and method for optimizing power consumption in voice communication in mobile devices. The system comprises pre-processing modules, a speech codec encoder module, a speech codec decoder module and post-processing modules. The pre-processing and post-processing modules are implemented on a DSP/VLIW processor, while the speech encoder and decoder modules are implemented on a CPU with SIMD extensions. This pipelined implementation of modules in multi-core reduces current consumption in the SoC by up to 50 percent compared to an implementation of the modules in a single DSP/VLIW core. The significant reduction in current consumption of the modules enables reduction of power consumption in the talk time.

15 Claims, 3 Drawing Sheets

(51) Int. Cl.
    *G10L 15/18* (2013.01)
    *G06F 3/16* (2006.01)
(52) U.S. Cl.
    CPC .......... *G10L 15/1822* (2013.01); *G10L 15/22* (2013.01); *G10L 2015/223* (2013.01)
(58) Field of Classification Search
    CPC ..... G10L 2015/223; G10L 2021/02082; G10L 21/0208; H04W 52/0235; Y02D 30/70
    See application file for complete search history.

(56) References Cited

U.S. PATENT DOCUMENTS

| | | | |
|---|---|---|---|
| 8,005,023 B2* | 8/2011 | Li | H04L 12/16 370/260 |
| 8,438,018 B2* | 5/2013 | Johansson | G10L 19/005 704/219 |
| 10,341,759 B2* | 7/2019 | Dusan | H04R 1/1083 |
| 10,390,309 B1* | 8/2019 | Anand | H04W 52/0261 |
| 2001/0046659 A1* | 11/2001 | Oster | G09B 17/006 434/178 |
| 2005/0216702 A1* | 9/2005 | Paolucci | G06F 15/7864 712/35 |
| 2007/0168908 A1* | 7/2007 | Paolucci | G06F 9/3885 717/100 |
| 2008/0043824 A1* | 2/2008 | Jacobs | H04L 67/10 375/220 |
| 2009/0088223 A1* | 4/2009 | Fratila | H04M 9/082 455/570 |
| 2009/0177465 A1* | 7/2009 | Johansson | G10L 19/00 704/219 |
| 2014/0037100 A1* | 2/2014 | Giesbrecht | G10K 11/002 381/71.8 |
| 2014/0046673 A1* | 2/2014 | Rathi | G10L 19/26 704/500 |
| 2016/0104501 A1* | 4/2016 | Weingold | G10L 21/0208 381/71.1 |
| 2016/0379661 A1* | 12/2016 | Kar | G10L 21/0232 704/227 |
| 2018/0343514 A1* | 11/2018 | Dusan | H04R 1/1083 |
| 2019/0333498 A1* | 10/2019 | Xu | G10L 25/54 |
| 2019/0384803 A1* | 12/2019 | Lee | G06F 17/141 |
| 2020/0204280 A1* | 6/2020 | Thagadur Shivappa | G01S 19/48 |
| 2021/0084592 A1* | 3/2021 | Anand | G10L 15/1815 |
| 2021/0223349 A1* | 7/2021 | Wei | G01S 3/8038 |

* cited by examiner

SYSTEM AND METHOD FOR OPTIMIZING POWER CONSUMPTION IN VOICE COMMUNICATIONS IN MOBILE DEVICES

CROSS-REFERENCE TO RELATED APPLICATIONS

The present application claims priority to Indian patent application serial no. 201941037326, filed Sep. 16, 2019, herein incorporated by reference.

DESCRIPTION OF THE INVENTION

Technical Field of the Invention

The present invention relates to a system and method for optimizing power consumption in mobile devices. More specifically, the present invention relates to optimizing power consumption in mobile devices by reducing current consumption in a voice call by implementing speech codecs on a CPU with SIMD extensions and post processing modules like acoustic echo cancellation, noise reduction and others on a DSP core.

BACKGROUND OF THE INVENTION

Wireless communication devices may be divided by function into voice devices such as cellular telephones and data devices such as PDAs or portable computers with wireless interfaces. Recent advances also include many smart portable wireless devices that can handle both voice and data and typically have a wide range of functional capabilities.

Such wireless communication devices are portable and therefore, they are typically dependent upon a battery. The wider array of functional capabilities may lead to increased power demands and furthermore, the rate at which battery power is consumed may vary greatly depending on the types of function performed and the frequency of use of those functions.

Additionally, wireless handsets are being designed to operate as multi-mode phones. Depending on the operational mode, the battery power that is consumed can vary substantially.

Minimizing power consumption and/or improving the data rate and user experience in User Equipment (UE) devices is important for all wireless communications systems. UE devices are increasingly consuming higher amounts of power as they become more and more sophisticated. UE devices have an onboard battery with a limited capacity. Thus, there is a problem of getting the best possible user experience wider the constraint of a limited battery.

The U.S. patent document U.S. Pat. No. 10/390,309 titled "System and method for optimizing power consumption in mobile devices" discloses a method and apparatus for optimizing power consumption in mobile devices by suitable Instruction Set Architectural feature changes and optimal implementation of speech codecs. However, the method does not talk about various post processing modules which are essential for clear voice communications in a mobile device.

Hence, there exists a need for system and method to optimize power consumption in mobile devices to account for clear voice communications in an efficient manner.

SUMMARY OF THE INVENTION

The present invention overcomes the drawbacks in the prior art and provides a system and method for optimizing power consumption in voice communication in mobile devices.

The system comprises a microphone which receives input speech and converts the speech into an electrical signal. The microphone is placed inside the mobile device. An anti-aliasing filter (AAF) receives signals from the microphone and transmits the signals to the Analog to Digital converter (ADC). The anti-aliasing filter is configured to filter components of the signal which are above the Nyquist frequency to prevent aliasing occurring at the sampling stage.

In an embodiment of the invention, speech signal is pre-processed to remove echo by an acoustic echo cancellation module followed by noise reduction module. The pre-processed speech samples are then fed to speech codec encoder module. The echo cancellation and noise reduction modules thus increase the loading on DSP/VLIW processor. The current consumption in the System-On-Chip (SoC) is lowered by implementing the echo cancellation and noise reduction modules on a DSP/VLIW core in the SoC while the speech encoder is implemented in Central Processing Unit (CPU) with Single Instruction Multiple Data (SIMD) extensions. The encoded signals are then channel encoded before transmission to network.

The system also includes speech codec decoder module disposed at the receiving end. The speech codec decoder module is configured to decompress/decode the received compressed signals from a channel codec decoder. The decoded speech signal is then fed to post processing modules to reduce noise and have clear and pleasant voice. The post processing modules are implemented in a DSP/VLIW core while the speech codec decoder is implemented in CPU with SIMD extensions.

Further, a speech receiver is configured to receive decoded and post processed speech from a DAC. The DAC transmits reconstructed speech samples.

Thus, the present invention also provides method to improve the power consumption in a voice call in mobile devices. The present method yields up to 50 percent savings in current consumption in a voice call compared to an implementation of Speech codecs and post processing modules on a single digital signal processor (DSP)/very long instruction word (VLIW) processor.

The talk time is increased by less power consumption, thereby reduction of thermal aspect and extension of battery life.

BRIEF DESCRIPTION OF THE DRAWINGS

The foregoing and other features of embodiments will become more apparent from the following detailed description of embodiments when read in conjunction with the accompanying drawings. In the drawings, like reference numerals refer to like elements.

DETAILED DESCRIPTION OF THE INVENTION

Reference will now be made in detail to the description of the present subject matter, one or more examples of which are shown in figures. Each example is provided to explain the subject matter and not a limitation. Various changes and modifications obvious to one skilled in the art to which the invention pertains are deemed to be within the spirit, scope and contemplation of the invention.

In order to more clearly and concisely describe and point out the subject matter of the claimed invention, the following definitions are provided for specific terms, which are used in the following written description.

The term "talk time" refers to the time during which a mobile telephone/mobile device is in use to handle calls, especially as a measure of the duration of the telephone's; mobile's battery.

The present invention provides a system and method for optimizing power consumption in voice communication in mobile devices. The system comprises a microphone, pre-processing modules including, but not limited to, echo cancellation and noise reduction modules, a speech codec encoder, a speech codec decoder, speech post processing modules including, but not limited to, noise reduction and a speech receiver. The pipelined implementation of Preprocessing/Postprocessing module and Speech codecs in different DSP/VLIW/CPU results in up-to 50 percent reduction of power consumption in the talk time compared to implementation of all these modules in a single DSP/VLIW processor. The system provides a simple method of optimizing power consumption by implementing the modules in voice call in different DSP/VLIW/CPU cores in mobile devices.

Figure 1:
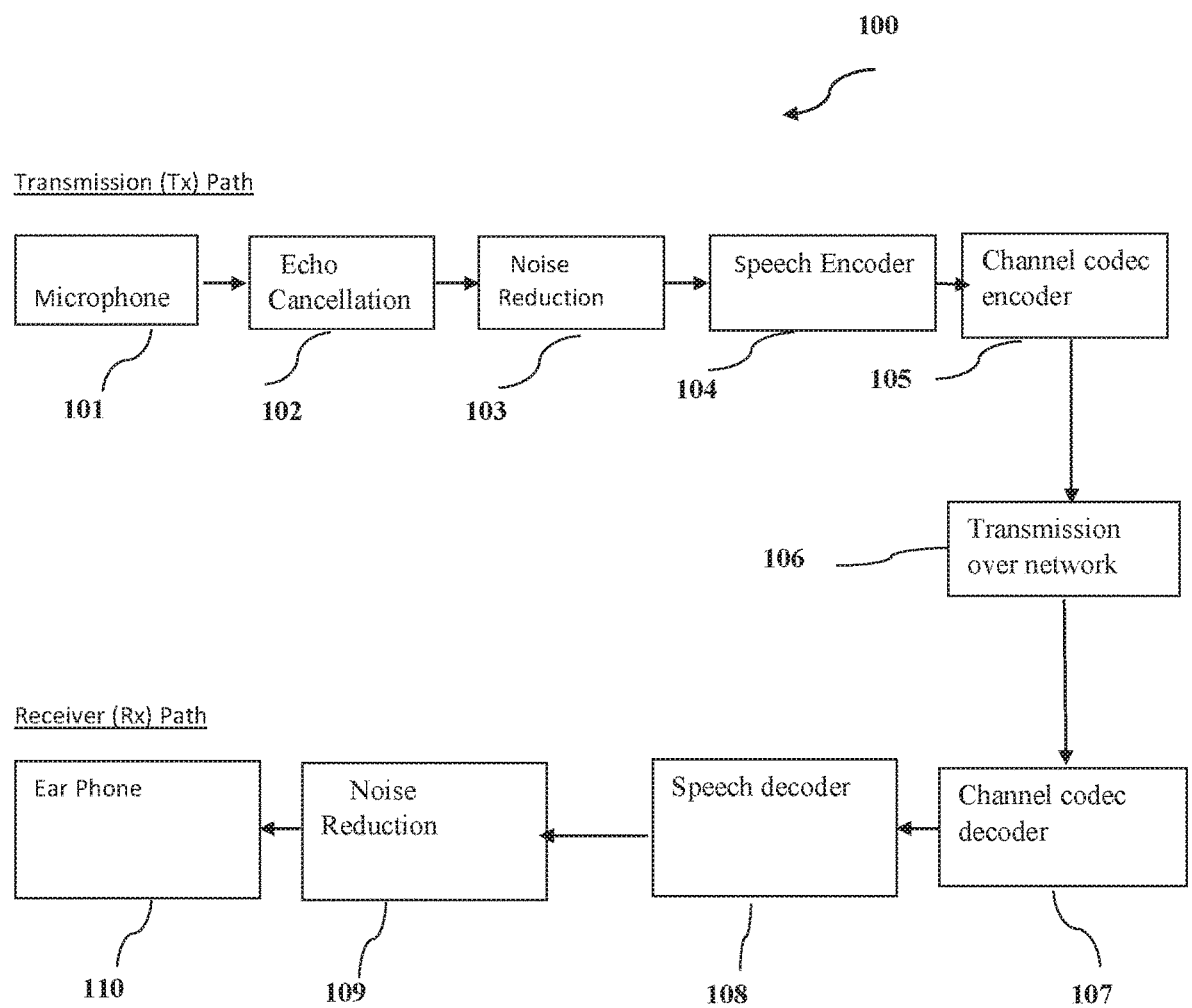
FIG. 1 illustrates a block diagram of a system for optimizing power consumption in voice communication in mobile devices, according to one embodiment of the invention.

FIG. 1 illustrates a block diagram of a system for optimizing power consumption in voice communication in mobile devices, according to one embodiment of the invention. In a preferred embodiment, the system comprises a microphone (101) which is coupled with a mobile device. The microphone (101) is configured to receive input speech and feeds speech samples to pre-processing module, echo cancellation (102). The processed speech samples are then passed to noise reduction module (103). The speech samples from noise reduction module are then input to the speech codec Encoder (104).

At the transmitting end, the speech samples are processed to remove acoustic echo (102) and noise (103). This is implemented on a DSP/VLIW processor. The processed speech samples are then fed to a speech codec encoder module (104). The speech codec encoder module is configured to compress/encode the speech signals running on a different processor, a CPU with SIMD extensions, for efficient transmission over wireless channels. The processing of speech frames is pipelined between the two different CPU/DSP/VLIW. The current consumption in the SoC is reduced up to 50 percent in the transmission path (102, 103, 104) compared to an implementation of the modules in a single DSP/VLIW core. The encoded signals are then coded by a channel codec encoder (105). The encoded signals are then transmitted over a transmission network (106).

Further, a speech codec decoder module (108) is present at receiving end. The speech codec decoder module (108) is configured to decompress/decode the received compressed speech signals (running on a CPU with SIMD extension) from a channel codec decoder (107). The decoded speech samples are then post processed to remove noise. The post processing modules is implemented in a DSP/VLIW processor. This pipelined implementation results in reduced current consumption (up to 50 percent) by the mobile device.

Figure 2:
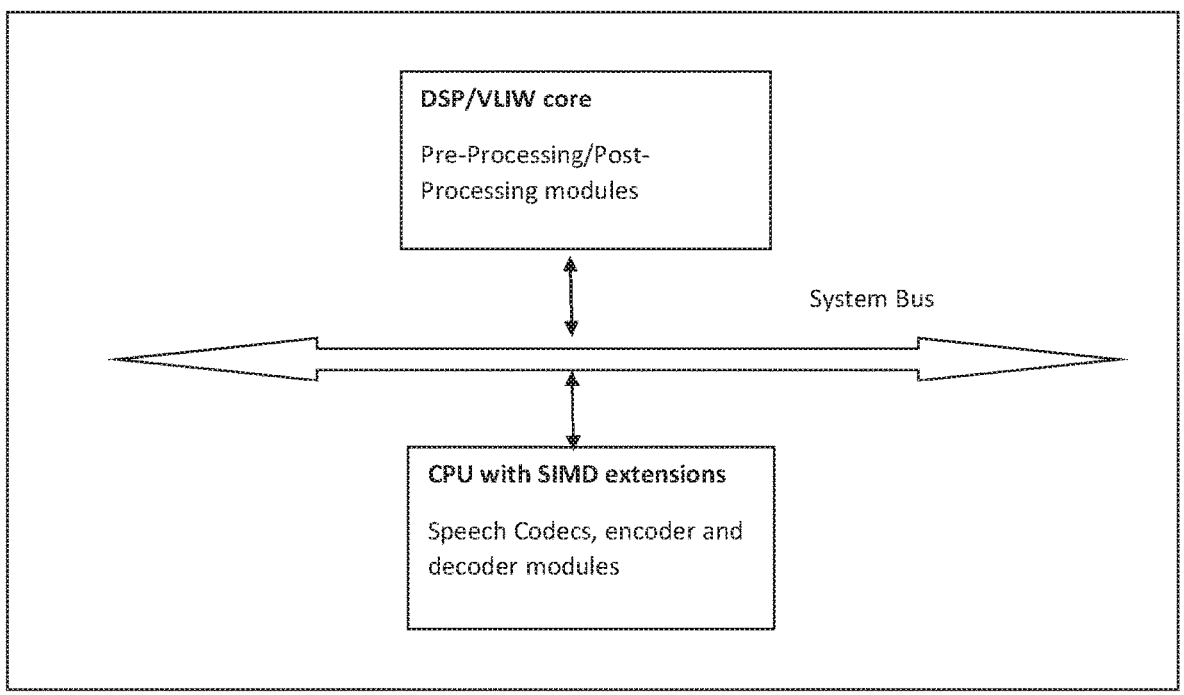
FIG. 2 illustrates method for optimizing power consumption in mobile devices, according to one embodiment of the invention.
Figure 3:
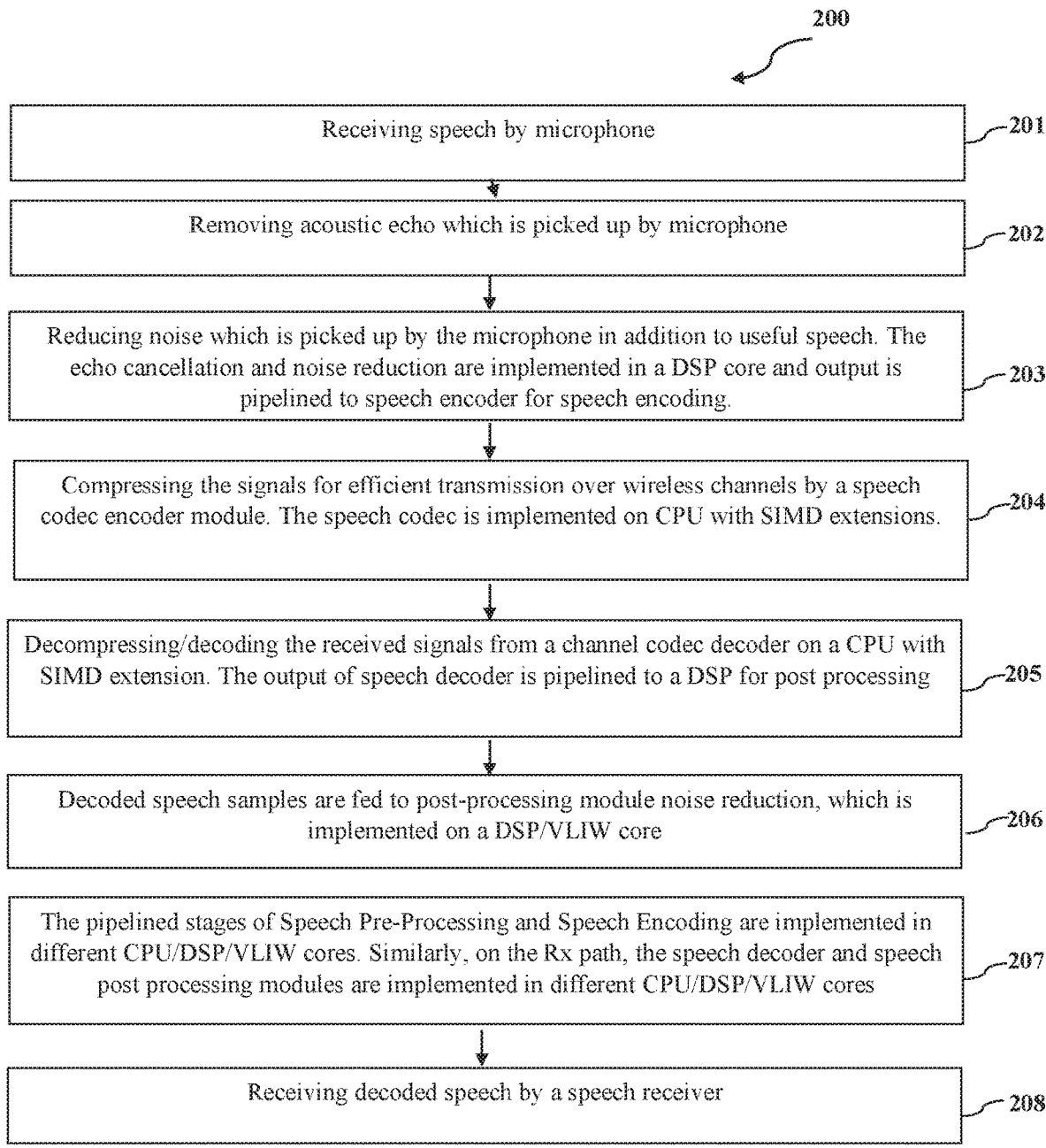
FIG. 3 illustrates method for optimizing power consumption in mobile devices, according to one embodiment of the invention.

FIG. 2 In an embodiment of the invention, the pipelined implementation of speech codec and post-processing/pre-processing modules on different DSP/VLIW/CPU core results in reducing current consumption by up to 50 percent (102, 103, 104, and 108, 109). The Architecture of the SoC contains DSP/VLIW and a CPU with SIMD extensions. Thus, low power voice communication is achieved using the present invention FIG. 3 illustrates the method for optimizing power consumption in voice communication in mobile devices, according to one embodiment of the invention. In a preferred embodiment, the method initiates with the step of receiving speech and converting the speech into an electrical signal by a microphone (101), at step 201.

At step 202, the echo signal picked up by microphone in addition to clean signal is removed by the echo cancellation module. This is implemented on a DSP/VLIW processor. At step 203, the speech signals are removed of noise by noise reduction module. This module is implemented on a DSP/VLIW processor. At step 204, pre-processed speech samples are compressed/encoded for efficient transmission over a wireless channel by a speech codec encoder module. The speech encoder is implemented on CPU with SIMD extensions. The current consumption in voice call is reduced by up to 50 percent by this multicore implementation (104). The encoded signals are transmitted to transmission network via a channel codec encoder (105).

At step 205, the compressed speech signal is received from the channel codec decoder. Wherein they are decompressed/decoded by the speech codec decoder (108).

At step 206, decoded speech is post-processed to remove noise (109). The post processed speech samples are then received by a speech receiver (110).

Thus, the present invention provides a method to improve the power consumption in a voice communication in mobile device. The talk time is increased by less power consumption, thereby reduction of thermal aspect and extension battery life.

The description of the present system has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

I claim:

1. A system for optimizing power consumption in voice communication in mobile devices, the system comprising:
   a. a microphone configured to receive input speech and convert the input speech into an electrical speech signal, wherein the microphone is coupled with a mobile device;
   b. pre-processing modules including, an acoustic echo cancellation and a noise reduction module, wherein the echo cancellation module receives electrical speech signals from the microphone and then the electrical speech signals undergo noise reduction and the electrical speech signals are pipelined to a speech encoder module, wherein the echo cancellation module and noise reduction module is implemented in a Digital Signal Processor (DSP)/Very Large Instruction Word (VLIW) processor;
   c. the speech encoder module configured to compress/encode electrical speech signals for transmission over wireless channels, wherein the implementation is performed on a Central Processing Unit (CPU) with Simple Instruction, Multiple Data (SIMD) extensions, wherein the encoded signals are transmitted over transmission network via a channel codec encoder;

d. a speech decoder module configured to decompress/decode the received compressed speech signal from a channel codec decoder, wherein the speech decoder is implemented on a CPU with SIMD extensions, wherein the speech decoder module is present at receiving end;

e. post-processing modules including noise reduction, wherein the decoded speech samples are processed on a DSP/VLIW core;

f. a System-On-Chip (SoC) device including the CPU with SIMD extensions and DSP/VLIW processing core to have pipelined implementation of the voice communication modules between the DSP/VLIW processing and CPU cores; and g. a speech receiver configured to receive post-processed speech from post-processing module, wherein the post-processing module transmits reconstructed electrical speech signals received from the speech decoder module.

2. The system as claimed in claim 1, wherein the speech codec module includes Adaptive Multi-Rate Narrow Band (AMR-NB) codec, Enhanced full rate (EFR) codec, Half Rate (HR) codec, Adaptive Multi-Rate Wideband (AMR-WB) codec, and Enhanced Voice Services (EVS) codec.

3. The system as claimed in claim 1, wherein each mobile device is one of a portable cell phone, a mobile handset, a mobile phone, a wireless phone, a cellular phone, a portable phone, a personal digital assistant (PDA), and a smartphone.

4. The system as claimed in claim 1, wherein the speech encoder and decoder modules are implemented on a CPU with SIMD extensions, while the pre-processing/post-processing modules are implemented on a DSP/VLIW processor.

5. The system as claimed in claim 1, wherein the optimizing power consumption is applicable in voice playback and voice record with no transmission.

6. The system as claimed in claim 1, wherein the current consumption is reduced by up to 50 percent in voice communication compared to implementation of all the modules including the speech encoder, the speech decoder, the Pre-processing and Post-processing modules on a single DSP/VLIW processor in the SoC.

7. A method for optimizing power consumption in mobile devices, the method comprising:

receiving, by a microphone, input speech; and converting, by the microphone, the input speech into an electrical speech signal, wherein the microphone is coupled with a first mobile device;

receiving, by an echo cancellation module from the microphone, the electrical speech signals;

processing, by the echo cancellation module, the electrical speech signals to generate a processed speech sample;

performing, a noise reduction module, noise reduction on the processed speech sample to generate a noise-reduced speech samples frame, wherein the echo cancellation module and a noise reduction module is implemented on a Digital Signal Processor (DSP)/Very Large Instruction Word (VLIW) processor;

pipelining the noise-reduced speech samples frame to a speech encoder module;

compressing and encoding, by the speech encoder module, the noise-reduced speech samples frame to generate compressed speech signals, wherein the speech encoder module is implemented on the Central Processing Unit (CPU) with a Simple Instruction, Multiple Data (SIMD) extensions;

transmitting, by a first mobile device, the encoded speech signals over a transmission network via a channel codec encoder;

receiving, by a second mobile device, the transmitted speech signals over the transmission network;

decompressing and decoding, by a speech decoder module, the received speech signals from a channel codec decoder, wherein the speech decoder is implemented on a second CPU with SIMD extensions, wherein the speech decoder is implemented within the second mobile device;

performing, by a second noise reduction module, noise reduction on the decoded signals, wherein the second noise reduction module is implemented on a second DSP/VLIW core, wherein a System-On-Chip (SOC) comprises a second CPU core with SIMD extensions and a second DSP/VLIW processor core for pipelined implementation of voice communication modules between the second DSP/VLIW processor core and the second CPU core;

receiving, by a speech receiver from a second noise reduction module, the noise-reduced speech signals;

reconstructing, by post-processing modules, the noise-reduced speech signals; and transmitting, by the post-processing modules, the reconstructed speech signals.

8. The method as claimed in claim 7, wherein the speech codec module includes Adaptive Multi-Rate Narrow band (AMR-NB) codec, Enhanced full rate (EFR) codec, Half Rate (HR) codec, Adaptive Multi-Rate Wideband (AMR-WB) codec, and Enhanced Voice Services (EVS) codecs.

9. The method as claimed in claim 7, wherein the mobile device is one of a portable cell phone, a mobile handset, a mobile phone, a wireless phone, a cellular phone, a portable phone, a personal digital assistant (PDA), and a smartphone.

10. A system for optimizing power consumption in voice communication in mobile devices, the system comprising:

a. a microphone configured to receive input speech and the input convert speech into an electrical speech signal, wherein the microphone is coupled with a mobile device;

b. pre-processing modules including, an acoustic echo cancellation and a noise reduction module, wherein the echo cancellation module receives electrical speech signals from the microphone and then the electrical speech signals undergo noise reduction and the electrical speech signals are pipelined to a speech encoder module, wherein the echo cancellation module and noise reduction module is implemented in a Digital Signal Processor (DSP)/Very Large Instruction Word (VLIW) processor;

c. the speech encoder module configured to compress/encode electrical speech signals for transmission over wireless channels, wherein the implementation is performed on a Central Processing Unit (CPU) with Simple Instruction, Multiple Data (SIMD) extensions, wherein the encoded speech signals are transmitted over transmission network via a channel codec encoder;

d. a speech decoder module configured to decompress/decode the received compressed speech signal from a channel codec decoder, wherein the speech decoder is implemented on a CPU with SIMD extensions, wherein the speech decoder module is present at receiving end;

e. post-processing modules including noise reduction, wherein the decoded speech samples are processed on a DSP/VLIW core;

f. a System-On-Chip (SoC) device including the CPU with SIMD extensions and DSP/VLIW processing core to have pipelined implementation of the voice communication modules between the DSP/VLIW processing and CPU cores; and g. a speech receiver configured to receive post-processed speech from post-processing module, wherein the post-processing module transmits reconstructed electrical speech signals received from the speech decoder module; and wherein the current consumption is reduced by up to 50 percent in voice communication compared to implementation of all the modules including the speech encoder module, the speech decoder, the Pre-processing and Post-processing modules on a single DSP/VLIW processor in the SoC.

11. The system as claimed in claim 10, wherein the speech codec module includes Adaptive Multi-Rate Narrow band (AMR-NB) codec, Enhanced full rate codec (EFR) codec, Half Rate (HR) codec, Adaptive Multi-Rate Wideband (AMR-WB) codec, and Enhanced Voice Services (EVS) codecs.

12. The system as claimed in claim 10, wherein the mobile device is one of a portable cell phone, a mobile handset, a mobile phone, a wireless phone, a cellular phone, a portable phone, a personal digital assistant (PDA), and a smartphone.

13. The system as claimed in claim 10, wherein the speech encoder and decoder modules are implemented on a CPU with SIMD extensions, while the pre-processing/post-processing modules are implemented on a DSP/VLIW processor.

14. the system as claimed in claim 10, wherein the optimizing power consumption is applicable in voice playback and voice record with no transmission.

15. The method of claim 10, further comprising reducing the current consumption by up to 50 percent in voice communication compared to implementation of al the modules including the speech encoder module, the speech decoder, the Pre-processing and Post-processing modules on a single DSP/VLIW processor in the SoC.

* * * * *